United States Patent
Day

(10) Patent No.: US 12,480,033 B2
(45) Date of Patent: Nov. 25, 2025

(54) WATER SOLUBLE ANIONIC METAL-ORGANIC CAGES AS CATION CAPTURE SPECIES FOR SCALE REDUCTION

(71) Applicant: Halliburton Energy Services, Inc., Houston, TX (US)

(72) Inventor: Gregory Steven Day, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 197 days.

(21) Appl. No.: 18/242,741

(22) Filed: Sep. 6, 2023

(65) Prior Publication Data

US 2025/0075119 A1 Mar. 6, 2025

(51) Int. Cl.
*C09K 8/532* (2006.01)
(52) U.S. Cl.
CPC .................................. *C09K 8/532* (2013.01)
(58) Field of Classification Search
None
See application file for complete search history.

(56) References Cited

U.S. PATENT DOCUMENTS

| 11,253,837 B2 | 2/2022 | Britt et al. |
| 2017/0166805 A1* | 6/2017 | Schultheiss ........... E21B 43/267 |
| 2023/0148311 A1 | 5/2023 | Deville et al. |

FOREIGN PATENT DOCUMENTS

WO    WO-2014116508 A1 *   7/2014    ............... C09K 8/74

OTHER PUBLICATIONS

Inorganic Chemistry, Ilic, et al., An Aluminum-Based Metal-Organic Cage for Cesium Capture, 2022.

* cited by examiner

*Primary Examiner* — Jeffrey D Washville
(74) *Attorney, Agent, or Firm* — Thomas Rooney; C. Tumey Law Group, PLLC

(57) ABSTRACT

Methods for scale treatment may include providing a treatment fluid, contacting an inorganic scale with the treatment fluid, and dissolving at least a portion of the inorganic scale through the capture and sequestration of the cationic components of the inorganic scale in pores of the metal-organic cage. The treatment fluid includes an inorganic scale remover comprising metal-organic cages and a base fluid. The metal-organic cages each comprises an organic ligand and a metal node.

19 Claims, 2 Drawing Sheets

US 12,480,033 B2

WATER SOLUBLE ANIONIC METAL-ORGANIC CAGES AS CATION CAPTURE SPECIES FOR SCALE REDUCTION

BACKGROUND

In the oilfield, scale deposits can represent a particular issue during various subterranean operations including drilling, casing, primary cementing, remedial cementing, hydraulic fracturing, gravel packing, frac-packing, solids control, wellbore and well remediation, swabbing, chemical injection, chemical flooding for enhanced oil recovery, steam injection, and production enhancement, among other wellbore operations. Scale can decrease the permeability of a subterranean formation, reduce well productivity, and shorten the lifetime of production equipment. Scale is a solid that precipitates out of solution or accumulates on the surface of subterranean materials, such as in fractures or subterranean flow pathways, or on equipment downhole, such as production tubing, gravel packing screens, or on equipment above the surface. Scale is a mineral or solid that is formed due to scale-forming ions that are present in water or petroleum downhole, such as $Fe^{2+}$, $Ca^{2+}$, $Mg^{2+}$, $Sr^{2+}$, and $Ba^{2+}$. Examples of scale include carbonate salts, sulfate salts, or sulfide salts, such as $CaCO_3$, $BaSO_4$, $SrSO_4$, $CaSO_4$, and FeS. Cleaning and removal of scale generally requires stopping production and is both time-consuming and costly. Scale control challenges are a leading cause of declining production worldwide. Scale costs the petroleum industry millions of dollars each year in scale control and removal costs, and in deferred production.

The deposition of inorganic scale inside production systems may be a persistent problem in the production of oil and gas. There is currently no generic solution for treating inorganic scale buildup. For example, iron sulfide scale may be a challenge to remove due to their tendency to reform in solution after treatment and existing treatments rarely achieve full removal. Current treatments may only remove up to about 60% of scale. The descaling of these iron sulfide may include two methods including mechanical removal and the chemical dissolution using mineral acids. Mechanical mitigation may be laborious and time inefficient. Chemical treatment, on the other hand, can be ineffective depending upon the form of the iron sulfide deposit. With current technology, different methods and mixtures of chemicals may be required depending upon the type of iron sulfide scale, and where along the pipeline or production tubing the scale is deposited.

Chemical treatment with mineral acids may also lead to metal corrosion and the production of toxic byproducts including hydrogen sulfide ($H_2S$). Treatment fluids including organic acids such as acetic, formic, and/or maleic acids with chelating agents have been developed to treat iron sulfide scale. However, organic acids may not be as effective in removing scale as mineral acids and may require a longer contact time for effective treatment.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
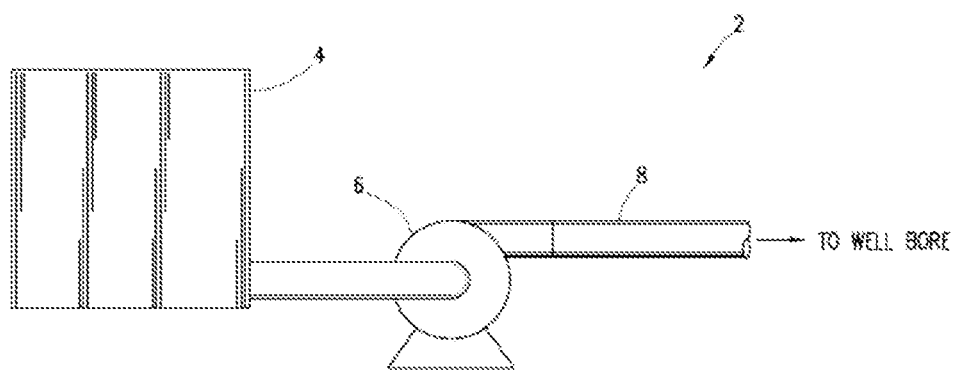
FIG. 1 is a schematic illustration of a fluid handling system for preparation and delivery of a treatment fluid comprising a metal sulfide dissolver into a wellbore according to an embodiment of the present disclosure.

The disclosure generally relates to inorganic scale removal. More specifically, the present disclosure may relate to compositions and methods of removing metal containing scale from equipment downhole, such as production tubing, gravel packing screens, and from equipment above the surface. The treatment fluid of one or more embodiments comprises a base fluid and metal-organic cages to remove metal containing scale in the production equipment downhole and above the surface. The treatment fluid can be injected on its own downhole in a wellbore or at surface in production equipment. Alternatively, the treatment fluid can be added as an additive to a stimulation fluid treatment, a fracturing fluid treatment, an acidizing fluid treatment, a corrosion inhibition treatment, a displacement fluid, a gravel packing treatment, for example. The metal containing scale can be a metal sulfide such as FeS, PbS, CaS, CuS, NiS, TiS, $Al_2S_3$, or any combination thereof, for example.

The base fluid may be any fluid suitable for use in a wellbore and capable of delivering the metal-organic cages. Suitable base fluids include oil-based fluids, aqueous-based fluids, aqueous-miscible fluids, water-in-oil emulsions, oil-in-water emulsions, and any combination thereof. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, produced water, wastewater, and any combination thereof. Suitable aqueous-miscible fluids may include, but are not limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof. Any of the aforementioned base fluids, with or without additional additives, may further be used as a displacement fluid as described above. In some examples, the aqueous base fluid has a pH range from about pH 4 to about pH 10 or about pH 5 to about pH 9, or about pH 7 to about pH 8.

Metal-organic cages (MOCs) are self-assembled structures derived from carefully selected combinations of metal ions and ligands. The choice of ligand is geared towards those with pendant metal binding groups, such as carboxylates, amines, amides, hydroxyl, thiols, sulfates, phosphines, phosphates, or related species. More specifically, ligand species that have geometrically regular metal binding sites, such as linear or trigonal carboxylates, can be excellent candidates to achieve strong geometric control over the cage structure. Cage structures that have metal binding sites that are not engaged in cage construction allow for additional interaction with scale cations. The metal-organic cages include supramolecular assemblies made from the combination of organic ligands and metals nodes. Metal-organic cages are discrete (or finite) molecular coordination complexes with an internal cavity, a single pore, that can be dispersed in solution. Porous metal-organic cages of myriad shapes and sizes are capable of binding guest molecules in their cavities. Metal-organic cages have high degree of structural tunability with cavities ranging from 1 angstrom to 1 micrometer (μm), or from 2 angstroms to 2 nanometers, or from 3 angstroms to 100 angstroms, or from 4 angstroms to 15 angstroms and surface areas of the metal-organic cage ranging from 1 μm²/g to 10,000 m²/g, or from 1 m²/g to 5,000 m²/g, or from 10 m²/g to 2,500 m²/g, or from 100 m²/g to 2,000 m²/g, or from 500 m²/g to 1,000 m²/g. Metal-organic cages comprise functional groups on their surfaces such as carboxylates, phosphonates, sulfonates, or metal-oxo species that are added to either the organic ligand or capped onto the metal nodes. Charge balance is accomplished with alkali metal or quaternary ammonium cations that can readily exchange with cations found in the produced water. For example, anionic functional groups can interact with scale forming metal salts, such as $Fe^{2+}$, $Ca^{2+}$, $Mg^{2+}$, $Sr^{2+}$, and $Ba^{2+}$. The charge balance cations or cationic portions of cages will interact with halides, carbonates, sulfates through electrostatic interactions and pore confinement. Further, metal-organic cages can interact with scale forming metal salts via surface adsorption and adsorption within their pore through additional Van der Waal, dipole-dipole, and ion-dipole interactions. The metal-organic cages functional groups and their high surface area allow the capture of 1 to 100 scale forming metal cations per metal-organic cage, or from 2 to 50 metal cations per metal-organic cage, or from 1 to 10 metal cations per metal-organic cage, or from 1 to 5 metal cations per metal-organic cage. The treatment fluid comprising the metal-organic cages and base fluid may be pumped either on its own or as an additive to prevent scale formation by capturing the metal cations before scale formation. Alternatively, the treatment fluid may be pumped after inorganic scale formation to remove the metal cations and dissolve the inorganic scale through adsorptive leeching of the metal cations in scale. As the cage molecules contact the scale deposits, the low localized concentration within the cage pore and exposed anion sites on the cage surface will facilitate first adsorption on the cage surface and then migration into the pore.

The metal-organic cage may be present in an amount of 0.01% to about 30% by weight of the treatment fluid, or from about 0.05% to about 10% by weight of the treatment fluid, or from about 0.075% to about 5% by weight of the treatment fluid, or from about 0.1% to about 1% by weight of the treatment fluid.

The organic ligands may be any suitable ligands which contain functional groups that can engage in coordination bonds with metal cations. These functional groups include carboxylate, sulfonate, phosphonate, imidazole, amine, thiol, hydroxyl, or a combination thereof. Suitable organic ligands include benzenedicarboxylic acid, benzenetricarboxylic acid, imidazole, 2,5-dihydroxyterephthalic acid, 2,5-pyridinedicarboxylic acid, 1,3,5-tri(4carboxyphenyl) benzene, 4,5-imidazoledicarboxylic acid, Pamoic acid, citric acid, ascorbic acid, glutamic acid, 2,5-dimercapto-1,4-benzenedicarboxylic acid, thiophene-2,5-dicarboxylic, 2,2'-Bipyridine-5,5'-dicarboxylic acid, Biphenyl-4,4'-dicarboxylic acid, 2-methylimidazole, 4-tert-Butylsulfonylcalix[4]arene, ethylenediamine, 2-aminoterephthalic acid, 2-mercaptoterephthalic acid, isophthalic acid, 5-nitroisophthalic acid, 5-hydroxyisophthalic acid, 3,7-di(p-carboxylic)-N-(p-phenylcarboxylic)-phenothiazine, 4,4'-Azobenzene dicarboxylic acid, 3,3',5,5'-azobenzenetetracarboxylic acid, 4-sulfonylcalix[4] arenetetrasulfonate.

The organic ligands may be present in an amount of about 65% to about 95% by weight of the treatment fluid, or from about 80% to about 95% by weight of the metal-organic cage, or from about 85% to about 95% by weight of the metal-organic cage.

The metal nodes may be any suitable metal nodes containing metal cations in combination with O, N, S, or C. Suitable metal cations include group IV metals such as Ti, Zr, Hf, the first two rows of the transition metals such as Sc, V, Cr, Mn, Fe, Co, Ni, Cu, Zn, Y, Nb, Mo, Tc, Ru, Rh, Pd, Ag, Cd, and Pt, Re, Os, Ir, Ca, Mg, Al, In, Sn, Bi, La, or Ce, or any combination thereof, for example. The metal nodes agent may be present in an amount of about 5% to about 35% by weight of the metal-organic cage, or 5% to about 25% by weight of the metal-organic cage, or 5% to about 15% by weight of the metal-organic cage.

The treatment fluid may also include any suitable additives that may serve a purpose other than delivery of the metal-organic cages. Examples of suitable additives include a salt, a weighting agent, an inert solid, a fluid loss control agent, an emulsifier, a dispersion aid, a corrosion inhibitor, an emulsion thinner, an emulsion thickener, a viscosifying agent, a gelling agent, a surfactant, a foaming agent, a gas, a pH control additive, a breaker, a biocide, a crosslinker, a stabilizer, a scale inhibitor, a gas hydrate inhibitor, a mutual solvent, an oxidizer, a reducer, a friction reducer, and any combination thereof.

The treatment fluid may be used to prevent formation of inorganic scale and/or for removal of any inorganic scale in any suitable operation at any suitable stage of the wellbore's life, which include well drilling and production. In embodiments, the inorganic scale treatment can be a metal containing scale remover. The treatment fluid comprises a base fluid and metal-organic cages. The treatment fluid may be introduced into the wellbore and may remove any form of metal containing scale from any surface along the wellbore and associated processing equipment by making fluidic contact. The metal containing scale can be iron sulfide scale.

The deposition of iron sulfide particles on the internal surfaces of a wellbore including pipelines and associated process equipment lead to scale buildup. Iron sulfide scales may be deposited in layers along a tubular such that a sample of scale may include several forms of iron sulfide within a section of scale. The disparate chemistry of the layers of iron sulfide may preclude dissolution of the iron sulfide scale by mineral acid alone, or organic acid alone, or chelating agent alone. Iron sulfide scale may exist in six different types and mixtures of said types which may include: purrhotite ($Fe_7S_8$), troilite (FeS), marcasite ($FeS_2$), pyrite ($FeS_2$), greigite ($Fe_2S_4$), and mackinawite ($Fe_9S_8$). Partially due to the sulfur, iron sulfide scales may be hydrophobic on their surfaces, and may be coated with oil in the oleaginous wellbore environment. The hydrophobic nature of iron sulfide scales may prevent dissolution of the scale by aqueous acids as the aqueous carrier may be prevented from contacting the scale. Iron sulfide scales range from having a well-defined crystalline structure to amorphous species. Physical properties of the iron sulfide scale range from viscous gels to powders to fluffy crystals. Morphology of the iron sulfide scale may vary from needle-like structures to granular particles. The physical structure of the iron sulfide scale may be dependent upon the chemical identity of iron sulfide as well as the conditions which the iron sulfide formed, for example. Additional components of the iron sulfide scale may include heteroatoms such as carbon, oxygen, chlorine, calcium, and combinations thereof in varying weight percentages.

FIG. 1 is a schematic illustration of a fluid handling system 2 for preparation and delivery of a treatment fluid comprising a base fluid and metal-organic cages into a wellbore according to an embodiment of the present disclosure. The fluid handling system 2 may be used for preparing the treatment fluid and introducing it into a wellbore. The fluid handling system 2 may include mobile vehicles, immobile installations, skids, hoses, tubes, fluid tanks or reservoirs, pumps, valves, and/or other suitable structures and equipment. For example, the fluid handling system 2 may include a fluid supply 4 and pumping equipment 6, which both may be fluidically coupled with a wellbore supply conduit 8. The fluid supply 4 may contain the treatment fluid comprising the base fluid and metal-organic cages. The pumping equipment 6 may be used to supply the treatment fluid comprising the base fluid and metal-organic cages from the fluid supply 4, which may include tank, reservoir, connections to external fluid supplies, and/or other suitable structures and equipment. While not illustrated, the fluid supply 4 may contain one or more components of the treatment fluid comprising the base fluid and metal-organic cages in separate tanks or other containers that may be mixed at any desired time. Pumping equipment 6 may be fluidically coupled with the wellbore supply conduit 8 to communicate the treatment fluid comprising the base fluid and metal-organic cages into wellbore. Fluid handling system 2 may also include surface and down-hole sensors (not shown) to measure pressure, rate, temperature and/or other parameters of the treatment fluid. Fluid handling system 2 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment. Fluid handling system 2 can be configured as shown in FIG. 1 or in a different manner, and may include additional or different features as appropriate. Fluid handling system 2 may be deployed via skid equipment, marine vessel deployed or may be comprised of sub-sea deployed equipment.

Figure 2:
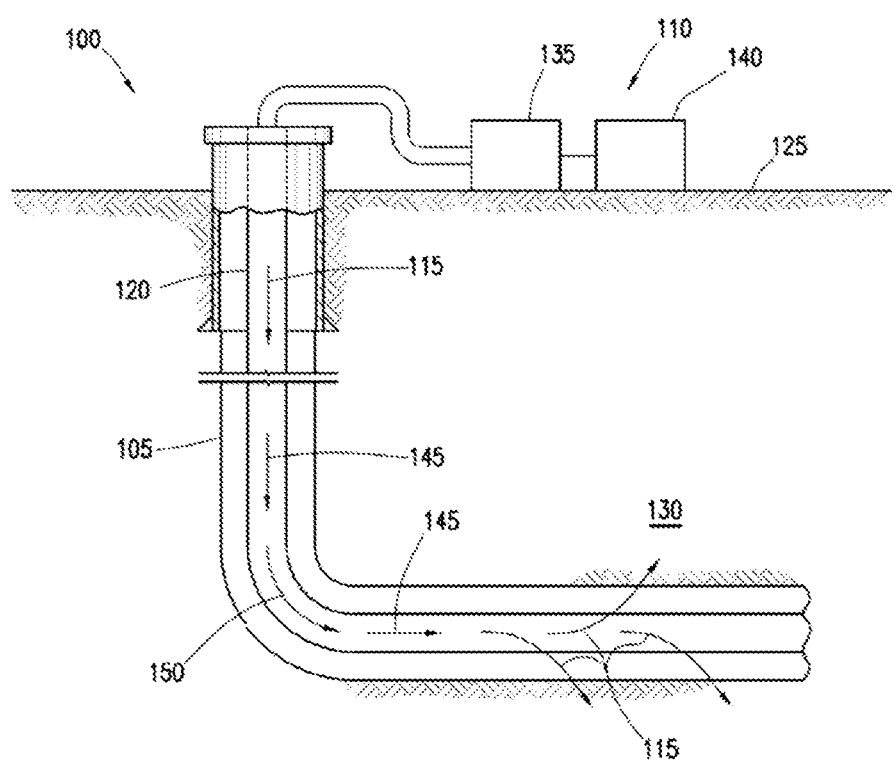
FIG. 2 is a schematic illustration of a well system for introduction of the treatment fluid comprising a metal sulfide dissolver into a wellbore according to an embodiment of the present disclosure.

Turning now to FIG. 2, an example well system 100 for introduction of an embodiment of the treatment fluid comprising the base fluid and metal-organic cages described herein into a wellbore 105 is shown. As depicted in FIG. 2, system 100 may include a fluid handling system 110 for introducing an embodiment of the treatment fluid 115 comprising the base fluid and metal-organic cages into the wellbore by way of tubular 120. One embodiment of the treatment fluid 115 may include any metal-organic cages and additives disclosed herein in any desirable volume and concentration. In the illustrated embodiment, the fluid handling system 110 is above the surface 125 while wellbore 105 and tubular 120 are below the surface 125. The fluid handling system 110 can be configured in any suitable manner to the operation and may include additional or different features as appropriate. The fluid handling system 110 may be deployed via skid equipment, marine vessel deployed or may be comprised of sub-sea deployed equipment.

As illustrated in FIG. 2, wellbore 105 may include vertical and horizontal sections. Generally, a wellbore 105 may include horizontal, vertical, slant, curved, and other types of wellbore geometries and orientations. Wellbore 105 may include a casing that is cemented or otherwise secured to the wellbore wall. Wellbore 105 can be uncased or include uncased sections. Fluid handling system 110 may include mobile vehicles, immobile installations, skids, hoses, tubes, fluid tanks or reservoirs, pumps, valves, and/or other suitable structures and equipment. For example, the fluid handling system 110 may include pumping equipment 135 and a fluid supply 140, which both may be in fluid communication with the tubular 120. The fluid supply 140 may contain a treatment fluid 115 comprising the base fluid and metal-organic cages according to one or more embodiments. The pumping equipment 135 may be used to supply the treatment fluid 115 comprising the base fluid and metal-organic cages from the fluid supply 140, which may include tank, reservoir, connections to external fluid supplies, and/or other suitable structures and equipment. Pumping equipment 135 may be coupled to tubular 120 to communicate the treatment fluid 115 comprising the base fluid and metal-organic cages into wellbore 105. Fluid handling system 110 may also include surface and down-hole sensors (not shown) to measure pressure, rate, temperature and/or other parameters of the treatment. Fluid handling system 110 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment.

Accordingly, the present disclosure may provide compositions and methods of removing inorganic scale from a wellbore, and particularly methods for removing metal containing scale deposits with a base fluid and metal-organic cages. The methods compositions/tools may include any of the various features disclosed herein, including one or more of the following statements.

Statement 1. A method comprising providing a treatment fluid comprising: metal-organic cages; and a base fluid; contacting an inorganic scale with the treatment fluid; and dissolving at least a portion of the inorganic scale through capture and sequestration of cationic components of the inorganic scale in pores of the metal-organic cage with the treatment fluid.

Statement 2. The method of Statement 1, wherein the metal-organic cages each comprises organic ligands and metal nodes.

Statement 3. The method of Statement 1 or Statement 2, wherein the metal organic cages each comprises at least one organic ligand selected from the group consisting of benzenedicarboxylic acid, benzenetricarboxylic acid, imidazole, 2,5-dihydroxyterephthalic acid, 2,5-pyridinedicarboxylic acid, 1,3,5-tri(4carboxyphenyl)benzene, 4,5-imidazoledicarboxylic acid, pamoic acid, citric acid, ascorbic acid, glutamic acid, 2,5-dimercapto-1,4-benzenedicarboxylic acid, thiophene-2,5-dicarboxylic, 2,2'-Bipyridine-5,5'-dicarboxylic acid, Biphenyl-4,4'-dicarboxylic acid, 2-methylimidazole, 4-tert-Butylsulfonylcalix[4]arene, ethylenediamine, 2-aminoterephthalic acid, 2-mercaptoterephthalic acid, isophthalic acid, 5-nitroisophthalic acid, 5-hydroxyisophthalic acid, 3,7-di(p-carboxylic)-N-(p-phenylcarboxylic)-phenothiazine, 4,4'-Azobenzene dicarboxylic acid, 3,3',5,5'-azobenzenetetracarboxylic acid, 4-sulfonylcalix[4]arenetetrasulfonate, and combination thereof.

Statement 4. The method of any previous Statements, wherein the metal organic cages each comprises at least one metal node selected from the group consisting of Ti, Zr, Hf, Sc, V, Cr, Mn, Fe, Co, Ni, Cu, Zn, Y, Nb, Mo, Tc, Ru, Rh, Pd, Ag, Cd, Pt, Re, Os, Ir, Ca, Mg, Al, In, Sn, Bi, La, or Ce, and combination thereof.

Statement 5. The method of any previous Statements, wherein the metal organic cages are present in an amount from about 0.1 wt % to 5 wt % by weight of the treatment fluid.

Statement 6. The method of any previous Statements, wherein the metal organic cages are present in an amount from about 0.1 wt % to 1 wt % by weight of the treatment fluid.

Statement 7. The method of any previous Statements, wherein the metal organic cages comprise organic ligands in an amount from 85 wt % to 95 wt % by weight of the metal-organic cages and metal nodes in an amount from 5 wt % to 15 wt % by weight of the metal-organic cages.

Statement 8. The method of any previous Statements, wherein the metal organic cages have surface areas from 500 $m^2/g$ to 1,000 $m^2/g$ and cavities from 4 angstroms to 15 angstroms.

Statement 9. The method of any previous Statements, wherein the base fluid comprises at least one liquid selected from the group consisting of water, methanol, isopropanol, acetonitrile, and acetone.

Statement 10. The method of any previous Statements, wherein the metal organic cages comprise functional groups on their surfaces comprising at least one selected from the group consisting of carboxylates, phosphonates, sulfonates, or metal-oxo species that are added to either the organic ligand or capped onto the metal nodes.

Statement 11. A method comprising: preparing a treatment fluid comprising: an inorganic scale remover comprising a base fluid and metal-organic cages; introducing the treatment fluid into a wellbore; and contacting an inorganic scale with the treatment fluid to dissolve at least a portion of the inorganic scale through capture and sequestration of cationic components of the inorganic scale in pores of the metal-organic cage with the treatment fluid.

Statement 12. The method of Statement 11, wherein the metal-organic cages each comprises organic ligands and metal nodes.

Statement 13. The method of Statement 11 or Statement 12, wherein the metal organic cages each comprises at least one organic ligand selected from the group consisting of benzenedicarboxylic acid, benzenetricarboxylic acid, imidazole, 2,5-dihydroxyterephthalic acid, 2,5-pyridinedicarboxylic acid, 1,3,5-tri(4carboxyphenyl)benzene, 4,5-imidazoledicarboxylic acid, Pamoic acid, citric acid, ascorbic acid, glutamic acid, 2,5-dimercapto-1,4-benzenedicarboxylic acid, thiophene-2,5-dicarboxylic, 2,2'-Bipyridine-5,5'-dicarboxylic acid, Biphenyl-4,4'-dicarboxylic acid, 2-methylimidazole, 4-tert-Butylsulfonylcalix[4]arene, ethylenediamine, 2-aminoterephthalic acid, 2-mercaptoterephthalic acid, isophthalic acid, 5-nitroisophthalic acid, 5-hydroxyisophthalic acid, 3,7-di(p-carboxylic)-N-(p-phenylcarboxylic)-phenothiazine, 4,4'-Azobenzene dicarboxylic acid, 3,3',5,5'-azobenzenetetracarboxylic acid, 4-sulfonylcalix[4]arenetetrasulfonate, and combination thereof.

Statement 14. The method of any of Statements 11-13, wherein metal organic cages each comprises at least one metal nodes selected from the group consisting of Ti, Zr, Hf, Sc, V, Cr, Mn, Fe, Co, Ni, Cu, Zn, Y, Nb, Mo, Tc, Ru, Rh, Pd, Ag, Cd, Pt, Re, Os, Ir, Ca, Mg, Al, In, Sn, Bi, La, or Ce, and combination thereof.

Statement 15. The method of any of Statements 11-14, wherein the metal organic cages are present in an amount of about 0.1 wt % to 1 wt % by weight of the treatment fluid.

Statement 16. The method of any of Statements 11-15, wherein the metal organic cages comprise organic ligands in an amount from 85 wt % to 95 wt % by weight of the metal-organic cages and metal nodes in an amount from 5 wt % to 15 wt % by weight of the metal-organic cages.

Statement 17. The method of any of Statements 11-16, wherein the metal organic cages have surface areas from 500 $m^2/g$ to 1,000 $m^2/g$ and cavities from 4 angstroms to 15 angstroms.

Statement 18. The method of any of Statements 11-17, wherein the base fluid comprises at least one liquid selected from the group consisting of water, methanol, isopropanol, acetonitrile, and acetone.

Statement 19. The method of any of Statements 11-18, wherein the metal organic cages comprise functional groups on their surfaces comprising at least one selected from the group consisting of carboxylates, phosphonates, sulfonates, or metal-oxo species that are added to either the organic ligand or capped onto the metal nodes.

Statement 20. A treatment fluid comprising: an inorganic scale remover comprising metal-organic cages, wherein the metal-organic cages each comprises organic ligands and metal nodes; and a base fluid.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method for scale treatment comprising:
   providing a treatment fluid comprising:
      metal-organic cages, wherein each metal-organic cage comprises a single pore; and
      a base fluid;
   contacting an inorganic scale with the treatment fluid; and
   dissolving at least a portion of the inorganic scale through capture and sequestration of cationic components of the inorganic scale in pores of the metal-organic cages in the treatment fluid.

2. The method of claim 1, wherein the metal-organic cages each comprises an organic ligand and a metal node.

3. The method of claim 1, wherein the metal-organic cages each comprises at least one organic ligand selected from the group consisting of benzenedicarboxylic acid, benzenetricarboxylic acid, imidazole, 2,5-dihydroxyterephthalic acid, 2,5-pyridinedicarboxylic acid, 1,3,5-tri(4carboxyphenyl)benzene, 4,5-imidazoledicarboxylic acid, pamoic acid, citric acid, ascorbic acid, glutamic acid, 2,5-dimercapto-1,4-benzenedicarboxylic acid, thiophene-2,5-dicarboxylic, 2,2'-Bipyridine-5,5'-dicarboxylic acid, Biphenyl-4,4'-dicarboxylic acid, 2-methylimidazole, 4-tert-Butylsulfonylcalix[4]arene, ethylenediamine, 2-aminoterephthalic acid, 2-mercaptoterephthalic acid, isophthalic acid, 5-nitroisophthalic acid, 5-hydroxyisophthalic acid, 3,7-di(p-carboxylic)-N-(p-phenylcarboxylic)-phenothiazine, 4,4'-Azobenzene dicarboxylic acid, 3,3',5,5'-azobenzenetetracarboxylic acid, 4-sulfonylcalix[4]arenetetrasulfonate, and any combination thereof.

4. The method of claim 1, wherein the metal-organic cages each comprises at least one metal node selected from the group consisting of Ti, Zr, Hf, Sc, V, Cr, Mn, Fe, Co, Ni, Cu, Zn, Y, Nb, Mo, Tc, Ru, Rh, Pd, Ag, Cd, Pt, Re, Os, Ir, Ca, Mg, Al, In, Sn, Bi, La, Ce, and any combination thereof.

5. The method of claim 1, wherein the metal-organic cages are present in the treatment fluid in an amount from about 0.1 wt % to 5 wt % by weight.

6. The method of claim 1, wherein the metal-organic cages are present in the treatment fluid in an amount from about 0.1 wt % to 1 wt % by weight.

7. The method of claim 1, wherein the metal-organic cages comprise organic ligands in an amount from 85 wt % to 95 wt % by weight and metal nodes in an amount from 5 wt % to 15 wt % by weight.

8. The method of claim 1, wherein the metal-organic cages have surface areas from 500 $m^2/g$ to 1,000 $m^2/g$ and cavities from 4 angstroms to 15 angstroms.

9. The method of claim 1, wherein the base fluid comprises at least one liquid selected from the group consisting of water, methanol, isopropanol, acetonitrile, and acetone.

10. The method of claim 1, wherein the metal-organic cages comprise functional groups on their surfaces comprising at least one functional group selected from the group consisting of a carboxylate, a phosphonate, a sulfonate, and a metal-oxo specie that are added to either an organic ligand or capped onto a metal node.

11. A method for scale treatment comprising:
providing a treatment fluid comprising:
 a base fluid and metal-organic cages, wherein each metal-organic cage comprises a single pore;
introducing the treatment fluid into a wellbore; and
contacting an inorganic scale with the treatment fluid to dissolve at least a portion of the inorganic scale through capture and sequestration of cationic components of the inorganic scale in pores of the metal-organic cages with the treatment fluid.

12. The method of claim 11, wherein the metal-organic cages each comprises an organic ligand and a metal node.

13. The method of claim 11, wherein the metal-organic cages each comprises at least one organic ligand selected from the group consisting of benzenedicarboxylic acid, benzenetricarboxylic acid, imidazole, 2,5-dihydroxyterephthalic acid, 2,5-pyridinedicarboxylic acid, 1,3,5-tri(4carboxyphenyl)benzene, 4,5-imidazoledicarboxylic acid, Pamoic acid, citric acid, ascorbic acid, glutamic acid, 2,5-dimercapto-1,4-benzenedicarboxylic acid, thiophene-2,5-dicarboxylic, 2,2'-Bipyridine-5,5'-dicarboxylic acid, Biphenyl-4,4'-dicarboxylic acid, 2-methylimidazole, 4-tert-Butylsulfonylcalix[4]arene, ethylenediamine, 2-aminoterephthalic acid, 2-mercaptoterephthalic acid, isophthalic acid, 5-nitroisophthalic acid, 5-hydroxyisophthalic acid, 3,7-di(p-carboxylic)-N-(p-phenylcarboxylic)-phenothiazine, 4,4'-Azobenzene dicarboxylic acid, 3,3',5,5'-azobenzenetetracarboxylic acid, 4-sulfonylcalix[4]arenetetrasulfonate, and any combination thereof.

14. The method of claim 11, wherein metal organic cages each comprises at least one metal node selected from the group consisting of Ti, Zr, Hf, Sc, V, Cr, Mn, Fe, Co, Ni, Cu, Zn, Y, Nb, Mo, Tc, Ru, Rh, Pd, Ag, Cd, Pt, Re, Os, Ir, Ca, Mg, Al, In, Sn, Bi, La, Ce, and any combination thereof.

15. The method of claim 11, wherein the metal-organic cages are present in the treatment fluid in an amount of about 0.1 wt % to 1 wt % by weight.

16. The method of claim 11, wherein the metal-organic cages comprise organic ligands in an amount from 85 wt % to 95 wt % by weight and metal nodes in an amount from 5 wt % to 15 wt % by weight.

17. The method of claim 11, wherein the metal-organic cages have surface areas from 500 $m^2/g$ to 1,000 $m^2/g$ and cavities from 4 angstroms to 15 angstroms.

18. The method of claim 11, wherein the base fluid comprises at least one liquid selected from the group consisting of water, methanol, isopropanol, acetonitrile, and acetone.

19. The method of claim 11, wherein the metal-organic cages comprise functional groups on their surfaces comprising at least one functional group selected from the group consisting of a carboxylate, a phosphonate, a sulfonate, or a metal-oxo specie that are added to either an organic ligand or capped onto a metal node.

\* \* \* \* \*